United States Patent

Iwashita

Patent Number: 5,311,110
Date of Patent: May 10, 1994

[54] FEEDFORWARD CONTROL METHOD FOR SERVOMOTORS

[75] Inventor: Yasusuke Iwashita, Oshino, Japan

[73] Assignee: Fanuc Ltd., Yamanashi, Japan

[21] Appl. No.: 877,183

[22] PCT Filed: Nov. 8, 1991

[86] PCT No.: PCT/JP91/01537

§ 371 Date: Jul. 1, 1992

§ 102(e) Date: Jul. 1, 1992

[87] PCT Pub. No.: WO92/09022

PCT Pub. Date: May 29, 1992

[30] Foreign Application Priority Data

Nov. 8, 1990 [JP] Japan .................. 2-301154

[51] Int. Cl.$^5$ .............................. G05B 19/407
[52] U.S. Cl. .................. 318/568.15; 318/568.22; 318/611
[58] Field of Search .............. 318/560–565, 318/568.15, 568.22, 606–611

[56] References Cited

U.S. PATENT DOCUMENTS

| | | | |
|---|---|---|---|
| 4,533,991 | 8/1985 | Georgis | 318/561 |
| 5,055,761 | 10/1991 | Mills | 318/696 |
| 5,073,747 | 12/1991 | Dupraz et al. | 318/609 X |
| 5,107,193 | 4/1992 | Iwashita | 318/560 |

FOREIGN PATENT DOCUMENTS

| | | |
|---|---|---|
| 59-062909 | 4/1984 | Japan . |
| 61-122720 | 6/1986 | Japan . |
| 63-167906 | 7/1988 | Japan . |
| 01-292405 | 11/1989 | Japan . |
| 03-015911 | 1/1991 | Japan . |

Primary Examiner—William M. Shoop, Jr.
Assistant Examiner—Brian Sircus
Attorney, Agent, or Firm—Staas & Halsey

[57] ABSTRACT

A feedforward control method having an improved follow-up characteristic with respect to commands in a servo system, and capable of a servomotor to operate smoothly and stably, is applied to a servo system in which a position/speed loop process is executed a plurality of times within one move command distribution period of an upper-level control device. A provisional speed command, which is the product of a gain (Kp) and a deviation (e) between an actual amount (Pf) of rotation of the motor and a move command (a) for each position and speed loop processing period, is corrected by a position feedforward quantity, which is the product of a coefficient ($\alpha 1$) and a mean value of move commands including the move command for each processing period and those before and after the present processing period calculated by a smoothing circuit to obtain a speed command. A provisional torque command obtained in a speed loop having an integral term and a proportional term is corrected by a speed feedforward quantity, which is the product of a coefficient ($\alpha 2$) and a differential value obtained by subjecting the mean value of the move commands to a lead compensation in a lead compensation element by a time period equal to a predetermined number of times the processing period to obtain a torque command for driving a servomotor.

5 Claims, 4 Drawing Sheets

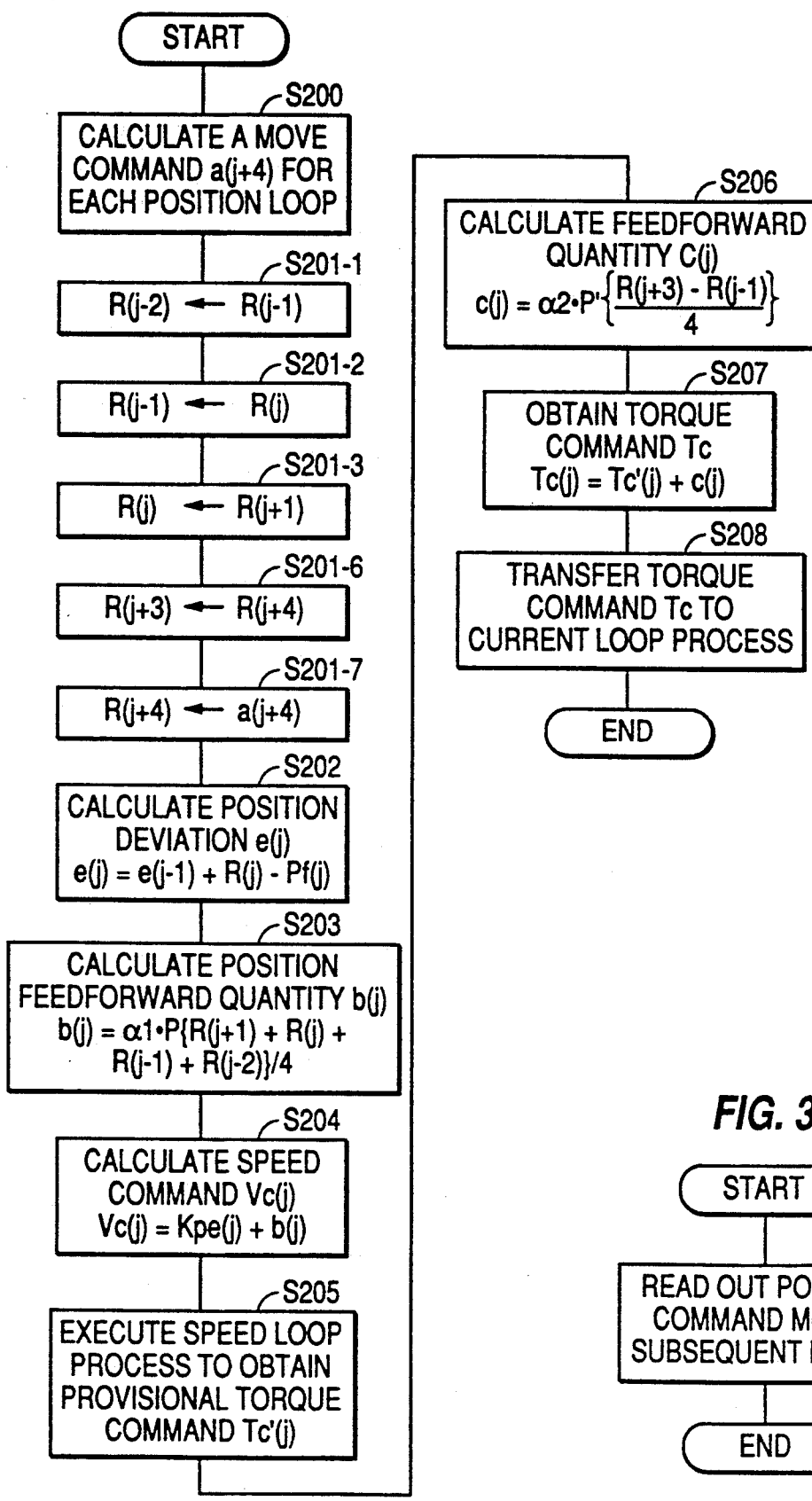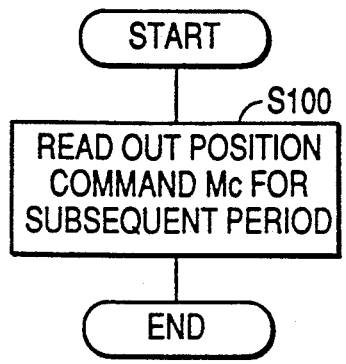

FEEDFORWARD CONTROL METHOD FOR SERVOMOTORS

FIELD OF THE INVENTION

This invention relates to a feedforward control method permitting smooth and stable operation of a servomotor.

DESCRIPTION OF THE RELATED ART

In servo systems in which servomotors are installed in various machines, such as machine tools and robots, as drive sources, they are controlled in such a manner that the deviation of an actual motor position from a commanded motor position becomes zero, and the position deviation increases if there is a follow-up delay with respect to the position command. This system, however, has a disadvantage that, for example, the shaping error tends to occur in the operation using machine tool, and such an error is very likely to occur particularly during a high-speed machining operation in which the position command changes rapidly.

Therefore, in servo systems wherein a position/speed loop process is executed at intervals shorter than predetermined pulse distribution intervals in accordance with a move command which is supplied from an upper-level control device at the pulse distribution intervals, a differential value of the position command is added to the speed command corresponding to the position deviation to provide a phase-lead compensation or a position feedforward control on the position command, thereby eliminating the response delay of the servo system with respect to the position command. In these types of servo systems, when the move command from the upper-level control device changes stepwise, an averaging of move commands will be made among the periods of the position loop processes belonging to one pulse distribution period, but the move command can change stepwise between the last position loop processing period in one pulse distribution period and the first position loop processing period in the subsequent pulse distribution period. More particularly, the speed command that has been subjected to the phase-lead compensation contains more high-frequency components than that on which no such compensation is performed. On the other hand, in conventional servo systems, the speed control loop for providing a current command corresponding to the deviation of an actual speed from the speed command does not have an adequate response to high-frequency components in the speed command.

Accordingly, in conventional servo systems, the position deviation undergoes wavy changes. Even if an acceleration/deceleration control is applied to the position command to make the position command change smoothly, a wavy change of the position deviation may still occur. As a result, a shock will be given to the servomotor and thus to a mechanical system using the motor as the drive source.

To eliminate such a drawback, a feedforward control device has been proposed (Japanese Patent Application No. 1-150481) in which a feedforward controlled variable, obtained by differentiating the position command, is subjected to an acceleration/deceleration process and then is added to a controlled variable obtained by the position control loop to obtain a speed command. This device not only can eliminate high-frequency noise components contained in the feedforward controlled variable but also can considerably reduce wavy changes of the position deviation. Nevertheless, the smoothing process used in this type of feedforward control devices for reducing wavy changes of the position deviation involves averaging past data, and therefore, the feedforward controlled variable is subject to a time lag with respect to the command. As a result, still wavy changes of the position deviation cannot always be sufficiently reduced.

DISCLOSURE OF THE INVENTION

An object of this invention is to provide a feedforward control method having an improved follow-up characteristic with respect to a command of a servo system and thus to enable a servomotor to operate smoothly and stably.

To achieve the above object, this invention provides a feedforward control method for a servo system in which a position/speed loop process is periodically carried out a plural number of times within one distribution period in accordance with a move command periodically distributed from an upper-level control device, comprising the steps of: (a) executing a position loop process in each position and speed loop processing period in accordance with a corresponding move command to calculate a provisional speed command; (b) calculating a means value of move commands corresponding to the each position and speed loop processing period and those corresponding to each position and speed loop processing periods before and after the each position and speed loop processing period; (c) calculating a feedforward controlled variable in accordance with the mean value of the move commands; and (d) correcting the provisional speed command by using the calculated feedforward controlled variable to obtain a speed command.

As described above, according to this invention, in each position and speed loop process, not only the move command for present processing period but also the move command for the subsequent position and speed loop processing period are used when calculating the feedforward controlled variable, and the speed loop process is carried out in accordance with a speed command corrected by the feedforward controlled variable, whereby the follow-up characteristic with respect to the commands for the servomotor can be improved. Accordingly, even when the move command supplied from the upper-level control device to the servo system changes stepwise, the position deviation does not undergo a wavy change, and therefore, the servomotor and a machine using the servomotor as a drive source can be smoothly and stably operated.

BRIEF DESCRIPTION OF THE DRAWINGS

FIG. 3 is a flowchart of a move command reading process to be executed by a processor of the digital servo control device;

FIG. 4 is a flowchart of a position and speed loop process to be executed by the processor;

DETAILED DESCRIPTION OF THE PREFERRED EMBODIMENTS

Figure 1:
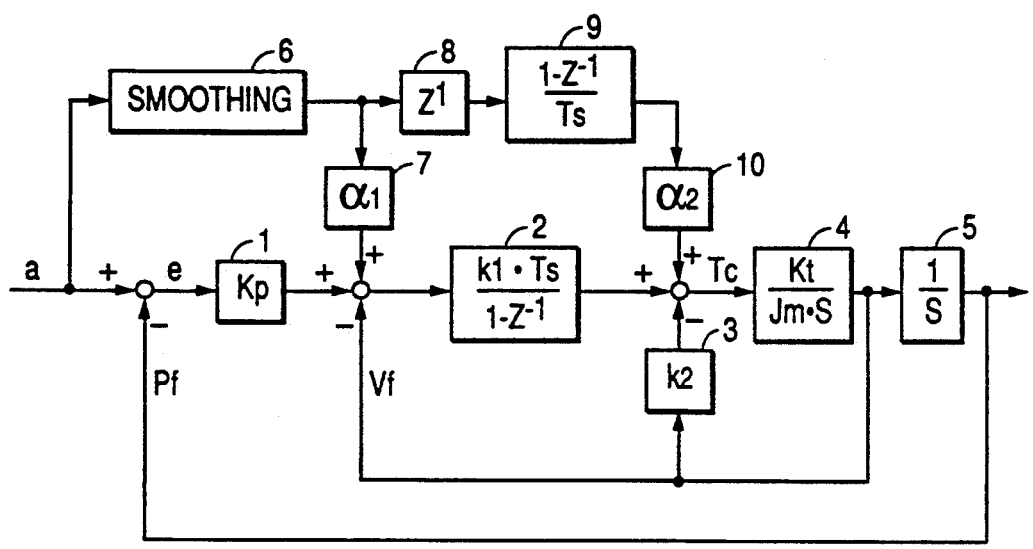
FIG. 1 is a schematic block diagram of a servo system for carrying out a feedforward control method according to an embodiment of this invention.

Referring to FIG. 1, a servo system comprises a position loop represented by a transfer element 1 having a position gain Kp, and a speed loop represented by a transfer element 2 corresponding to an integral term of the speed loop and a transfer element 3 having a proportional gain k2. Symbol k1 denotes an integral gain, Ts a position/speed loop processing period, and $Z^{-1}$ and Z-transform for delaying a speed command by a time period corresponding to one position/speed loop process. A transfer element 4 corresponds to the mechanical parts of a servomotor, and symbols Kt and Jm represent a torque constant and inertia respectively. A transfer element 5 corresponds to a position detector for detecting the rotational position of the servomotor. A transfer element 6, comprising a smoothing circuit, and a transfer element 7 correspond to a position feedforward term of the servo system, and symbol $\alpha 1$ represents a position feedforward coefficient. Transfer elements 8, 9 and 10 correspond to a speed feedforward term of the servo system; symbol $Z^1$ represents a Z-transform for advancing the output of the smoothing circuit 6 by a time period corresponding to one position and speed loop process; and $\alpha 2$ represents a speed feedforward coefficient of the servo system. The transfer elements 2, 8 and 9 are indicated by a discrete-time system.

The servo system having the above-described configuration carries out the position and speed loop process a plurality of times, e.g., N times, during one distribution period in accordance with a move command periodically distributed from an upper-level control device, e.g., a numerical control device, at predetermined ITP intervals. An ITP interval is a move-command distribution period. For a move command to move from a starting pointing A to a target B, a numerical control system performs interpolation to determine a path from point A to point B at predetermined time intervals, and gives a move-command to a position loop. Therefore, the servo system is supplied with move commands a(j) for position and speed loop processing periods j (=1, 2, ..., N) included in one distribution period. Also, a move command corresponding to the distribution period subsequent to the present distribution period including each processing period j, is supplied to the servo system, for example, for use in a speed command compensation, as described later.

In each position/speed loop processing period j, a feedback signal Pf supplied from the transfer element 5 as a signal representing an actual motor position is subtracted from the move command a(j) to obtain a position deviation e. Subsequently, an actual motor speed Vf is subtracted from the product of the position deviation e and the proportional gain Kp to derive a provisional speed command. On the other hand, the smoothing circuit 6 calculates a mean value of move commands based on the move command corresponding to the present distribution period and the move command corresponding to the subsequent distribution period such as a mean value of the move commands ranging from a position and speed loop processing period preceding the present processing period by (N/2)−1 to a processing period later than the present processing period by N/2. Then, in the transfer element 7, the product of the position feedforward coefficient $\alpha 1$ and a transform coefficient P, which is used for transforming the move command into a speed command value, is multiplied by the mean value calculated as above to obtain a position feedforward quantity b(j), which can be expressed by the following equation (1):

$$b(j) = \alpha 1 \cdot P \cdot \sum_{k=-N/2+1}^{N/2} a(j-k)/N \tag{1}$$

The position feedforward quantity b(j) is added to the provisional speed command to obtain a position feedforward-compensated speed command, and the obtained speed command is subjected to an integration at the integral term 2 of the speed loop. Then, the product of the actual motor speed Vf and the proportional constant k2 is subtracted from the output of the integral term 2 to derive a provisional torque command. On the other hand, in the transfer element 8, the output of the smoothing circuit 6 is advanced by a time period corresponding to one position and speed loop processes and in the transfer element 9, the output of the transfer element 8 is differentiated. Further, in the transfer element 10, the product of the speed feedforward coefficient $\alpha 2$ and a transform coefficient P' which is used to transform the move command into a current value, is multiplied by the output of the transfer element 9, whereby a speed feedforward quantity c(j) expressed in equation (2) below is obtained.

$$c(j) = \alpha 2 \cdot P \cdot \tag{2}$$

$$\left\{ \sum_{k=-N/2-1+1}^{N/2-1} a(j-k) - \sum_{k=-N/2-1+2}^{N/2-1+1} a(j-k) \right\}/N$$

Then, the speed feedforward quantity c(j) is added to the provisional torque command to obtain a speed feedforward-compensated torque command, and the servomotor is driven in accordance with the obtained torque command.

Figure 2:
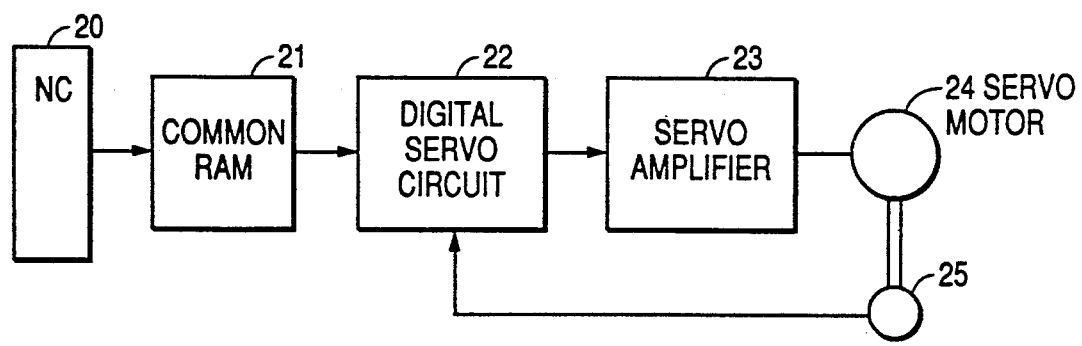
FIG. 2 is a schematic block diagram of a digital servo control device corresponding to the servo system shown in FIG. 1.

Now, referring to FIG. 2, a digital servo control device including the servo system of FIG. 1 will be described.

The digital servo control device comprises a digital servo circuit 22 including a microcomputer. A central processing unit (CPU) of the microcomputer is connected not only to a numerical control device 20 through a common memory 21 formed of a random-access memory but also to a servomotor 24 through an output circuit of the computer and a servo amplifier 23 formed of a transistor inverter, for example. Further, the CPU is connected to a pulse coder 25, which is for generating feedback pulses in accordance with the motor rotation, through an input circuit of the computer. A pulse train is generated by the pulse coder 25 at a frequency corresponding to the actual motor speed and represents the actual motor position.

The CPU reads out a move command which has been stored in the common RAM 21 by the NC device 20 at the predetermined ITP intervals, and calculates move commands for N position and speed loop processing periods included in one move-command distribution period ITP, e.g., move commands for each of the four position/speed loop processing periods a(j) (j=4n−3, 4n−2, 4n−1, 4n: n being an integer equal to or more than 1), in such a manner that the move commands are uniformly distributed within the period ITP. Further, the CPU executes a software processing in accordance with a control program (not shown) to accomplish the function of the servo system shown in FIG. 1.

More particularly, in each position and speed loop processing period, the CPU carries out a position loop process in accordance with the present amount Pf of rotation of the motor, which corresponds to the number of the feedback pulses generated by the pulse coder 25 during the processing period concerned, and the move command a(j) to calculate the provisional speed command, and carries out a position feedforward compensation process, described in detail later, to obtain the speed command. When n=4, i.e., when the position and speed loop process is to be executed four times within one distribution period, the CPU calculates, in the position feedforward compensation process, the position feedforward quantity b(j) in accordance with the following equation (3) corresponding to equation (1).

$$b(j) = \alpha 1 \cdot P \cdot \sum_{k=-1}^{2} a(j-k)/4 \quad (3)$$
$$= \alpha 1 \cdot P \cdot \{a(j+1) + aj + a(j-1) + a(j-2)\}/4$$

Then, the CPU carries out the speed loop process in accordance with the present rotational speed Vf of the motor, which corresponds to the frequency of the generated feedback pulses, and the speed command to calculate a provisional torque command (current command), and carries out a speed feedforward compensation process, which will be mentioned later, to obtain the torque command. When l=2, or when the output of the smoothing circuit 6 in FIG. 1 is advanced by a time period corresponding to two position/speed loop processes, the CPU calculates the speed feedforward quantity c(j) in accordance with the following equation (4) corresponding to equation (2):

$$c(j) = \alpha 2 \cdot P' \cdot \left( \sum_{k=-3}^{0} a(j-k) - \sum_{k=-2}^{1} a(j-k) \right)/4 \quad (4)$$

Further, the CPU executes a current loop process in accordance with the torque command to obtain a PWM command. A current feedforward compensation similar to the position or speed feedforward compensation may be executed as required. The servomotor 24 is driven by the servo amplifier 23, which operates in accordance with the PWM command.

Referring to FIGS. 3 and 4, the position and speed loop process, which is executed periodically, e.g., four times within one distribution period ITP by the CPU of the digital servo circuit 22, will be described in detail.

At the beginning of each ITP period, the CPU reads out a move command Mc for a subsequent period ITP from the NC device 20 through the common RAM 21 (Step S100 of FIG. 3). In practice, upon start of each ITP period, the move command Mc for the present period ITP, supplied from the NC device 20, is read, whereas the position/speed loop process is executed with a time lag corresponding to one distribution period ITP, whereby an effect similar to that obtained in the case of reading out the move command Mc for the subsequent period ITP at the beginning of each ITP period can be obtained.

At the beginning of a jth (j=1, 2, 3 or 4) position and speed loop processing period in each ITP period, the CPU calculates a move command a(j+4) for the jth position and speed loop processing period included in the subsequent ITP period on the basis of the move command Mc read in Step S100 as the move command for the ITP period subsequent to that including the present period (Step S200). Then, after transmitting the contents of registers R(j−1) through R(j+4) to registers R(j−2) through R(j+3) respectively, the calculated move command a(j+4) is stored in the register R(j+4) (Steps S201-1 to S201-7).

Subsequently, the CPU reads out a position deviation e(j−1) of the preceding (j−1)th processing period from a position deviation register, and the move command a(j) for the jth processing period from the register R(j), and subtracts the present amount Pf(j) of rotation of the motor, detected by the pulse coder 25, from the sum of the position deviation e(j−1) and the move command a(j) to obtain the position deviation e(j) of the jth processing period (Step S202). Then, the CPU calculates the position feedforward quantity b(j) in accordance with equation (3), as well as by using the move commands a(j+1), a(j), a(j−1) and a(j−2) read from the corresponding registers (Step S203), obtains a provisional speed command by multiplying the position deviation e(j) by the position loop gain Kp, and adds the position feedforward quantity b(j) to the provisional speed command to obtain the speed command Vc(j) (Step S204).

Further, the CPU executes the speed loop process in accordance with the speed command Vc(j), to obtain a provisional torque command Tc'(j) (Step S205). The CPU then calculates the speed feedforward quantity c(j) in accordance with equation (4), as well as by using the move command a(j+3) read from the corresponding register (Step S206), and adds the speed feedforward quantity c(j) to the provisional torque command Tc'(j) to obtain a torque command Tc(j) (Step S207). Then, the CPU transfers the torque command Tc(j) to the current loop process (Step S208) to end the jth position/speed loop process.

Figure 5:
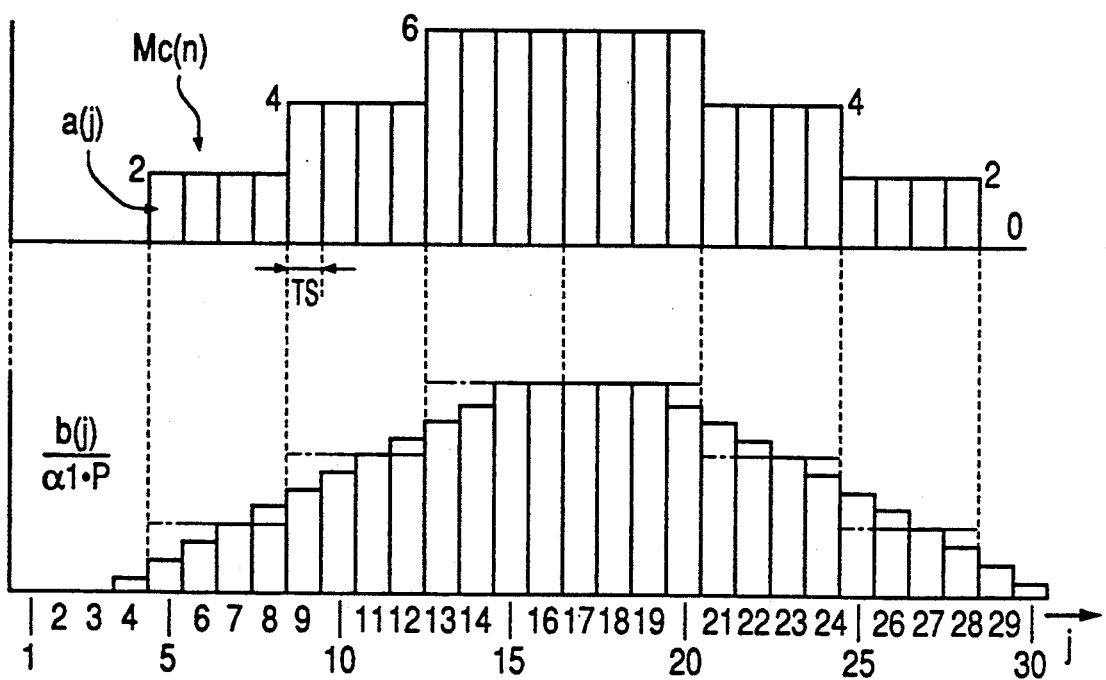
FIG. 5 is a graph showing an example of move commands and position feedforward quantities in each of successive position/speed loop processing periods.

By way of example, FIG. 5 shows a move command Mc(n) supplied from the NC device 20 in an nth distribution period (n=1, ..., 8) move commands a(j) calculated for the j position/speed loop processing periods (j=1, 2, ..., 30), and values b(j)/α1·P obtained by dividing the calculated position feedforward quantity b(j) by the product α1·P. The table below shows an example of move commands a(n) for the individual position/speed loop processing periods included in the nth distribution period, the register values a(j+4) to a(j−2) in jth processing period and the value b(j)/α1·P. In table, symbols +4, ..., j, ..., −2 represent the register values a(j+4), ..., aj, ..., a(j−2) respectively, and b(j) represents the value b(j)/α1·P.

TABLE

| n | j | a(j) | +4 | +3 | +2 | +1 | j | −1 | −2 | b(j) |
|---|---|---|---|---|---|---|---|---|---|---|
| 1 | 1 | 0 | 2 | 0 | 0 | 0 | 0 | 0 | 0 | 0 |
|   | 2 | 0 | 2 | 2 | 0 | 0 | 0 | 0 | 0 | 0 |
|   | 3 | 0 | 2 | 2 | 2 | 0 | 0 | 0 | 0 | 0 |
|   | 4 | 0 | 2 | 2 | 2 | 2 | 0 | 0 | 0 | 1/2 |
| 2 | 5 | 2 | 4 | 2 | 2 | 2 | 2 | 0 | 0 | 1 |
|   | 6 | 2 | 4 | 4 | 2 | 2 | 2 | 2 | 0 | 3/2 |
|   | 7 | 2 | 4 | 4 | 4 | 2 | 2 | 2 | 2 | 2 |
|   | 8 | 2 | 4 | 4 | 4 | 4 | 2 | 2 | 2 | 5/2 |
| 3 | 9 | 4 | 6 | 4 | 4 | 4 | 4 | 2 | 2 | 3 |
|   | 10 | 4 | 6 | 6 | 4 | 4 | 4 | 4 | 2 | 7/2 |
|   | 11 | 4 | 6 | 6 | 6 | 4 | 4 | 4 | 4 | 4 |
|   | 12 | 4 | 6 | 6 | 6 | 6 | 4 | 4 | 4 | 9/2 |
| 4 | 13 | 6 | 6 | 6 | 6 | 6 | 6 | 4 | 4 | 5 |
|   | 14 | 6 | 6 | 6 | 6 | 6 | 6 | 6 | 4 | 11/2 |
|   | 15 | 6 | 6 | 6 | 6 | 6 | 6 | 6 | 6 | 6 |
|   | 16 | 6 | 6 | 6 | 6 | 6 | 6 | 6 | 6 | 6 |
| 5 | 17 | 6 | 4 | 6 | 6 | 6 | 6 | 6 | 6 | 6 |
|   | 18 | 6 | 4 | 4 | 6 | 6 | 6 | 6 | 6 | 6 |
|   | 19 | 6 | 4 | 4 | 4 | 6 | 6 | 6 | 6 | 6 |
|   | 20 | 6 | 4 | 4 | 4 | 4 | 6 | 6 | 6 | 11/2 |
| 6 | 21 | 4 | 2 | 4 | 4 | 4 | 4 | 6 | 6 | 5 |
|   | 22 | 4 | 2 | 2 | 4 | 4 | 4 | 4 | 6 | 9/2 |
|   | 23 | 4 | 2 | 2 | 2 | 4 | 4 | 4 | 4 | 4 |
|   | 24 | 4 | 2 | 2 | 2 | 2 | 4 | 4 | 4 | 7/2 |
| 7 | 25 | 2 | 0 | 2 | 2 | 2 | 2 | 4 | 4 | 3 |
|   | 26 | 2 | 0 | 0 | 2 | 2 | 2 | 2 | 4 | 5/2 |
|   | 27 | 2 | 0 | 0 | 0 | 2 | 2 | 2 | 2 | 2 |
|   | 28 | 2 | 0 | 0 | 0 | 0 | 2 | 2 | 2 | 3/2 |
| 8 | 29 | 0 | 0 | 0 | 0 | 0 | 0 | 2 | 2 | 1 |
|   | 30 | 0 | 0 | 0 | 0 | 0 | 0 | 0 | 2 | 1/2 |
|   | 31 | 0 | 0 | 0 | 0 | 0 | 0 | 0 | 0 | 0 |
|   | 32 | 0 | 0 | 0 | 0 | 0 | 0 | 0 | 0 | 0 |

As seen from FIG. 5 and the table, even when the move command a(j) immediately changes between adjacent distribution periods ITP, the position feedforward quantity b(j) will not change rapidly unlike the conventional feedforward control using a feedforward quantity equal to the product of the differential value and the coefficient. Accordingly, the position deviation does not undergo wavy changes.

Figure 6:
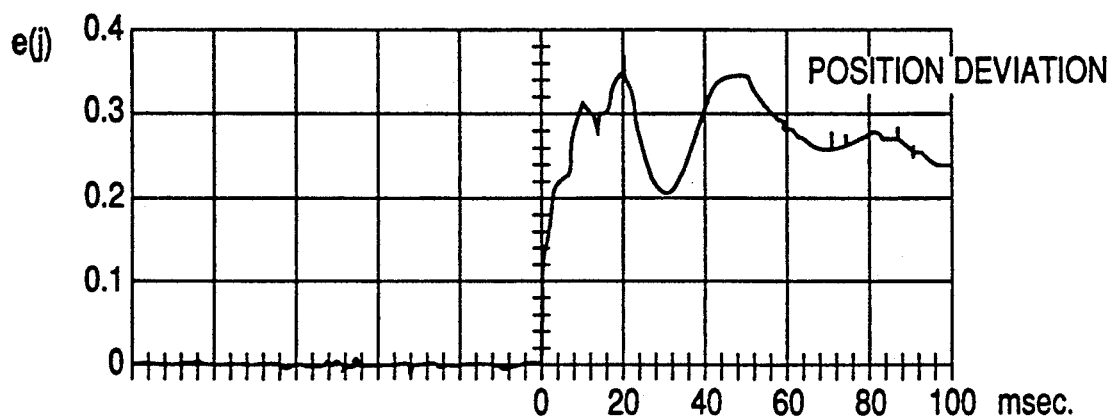
FIG. 6 is a graph showing an example of a change of a position deviation in a servo system for carrying out a conventional feedforward control, observed when a ramp input of the move command is made to the servo system.
Figure 7:
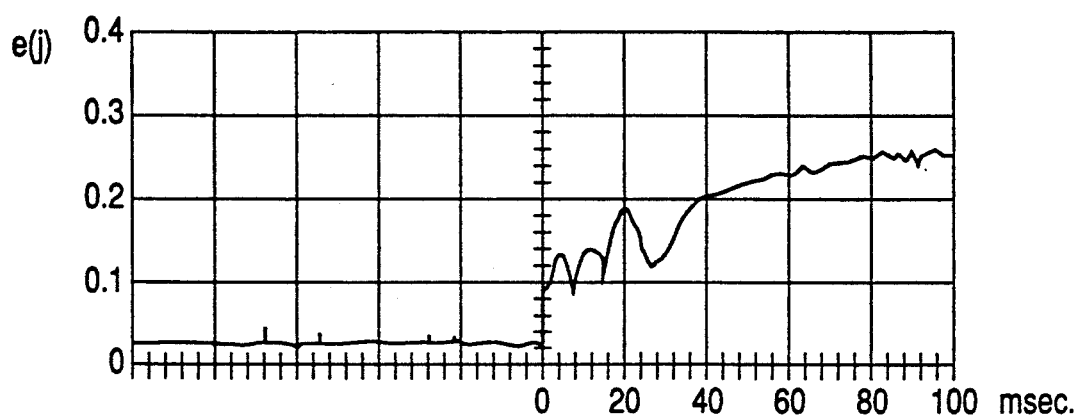
FIG. 7 is a graph showing an example of a change of the position deviation observed when a lead quantity 1 for a speed feedforward control is set to zero and the ramp input of the move command is made, according to the embodiment of this invention.
Figure 8:
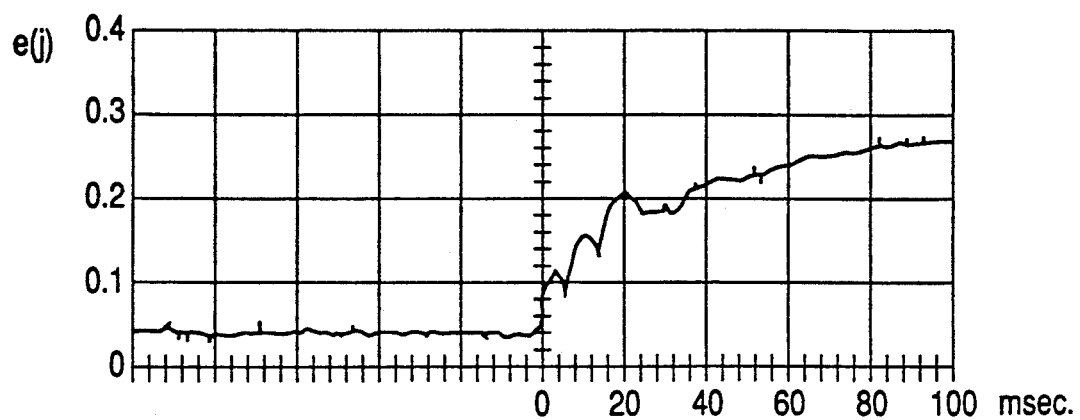
FIG. 8 is a graph similar to FIG. 7, obtained when the lead quantity 1 is set to "2".

In the conventional feedforward control mentioned above, the position deviation changes as shown in FIG. 6, when the move command is inputted by means of a ramp input. On the other hand, in the feedforward control according to the above-described embodiment, the position deviation changes as shown in FIG. 7 when a lead quantity 1 of the speed feedforward control is set to zero, and changes as shown in FIG. 8 when the lead quantity 1 is set to "2". As is obvious from FIGS. 6 to 8, wavy changes of the position deviation in the embodiment as much smaller than in the conventional method.

In the above embodiment, when calculating the position feedforward quantity b(j) in each position and speed loop processing period, the mean value of the move commands a(j+1), a(j), a(j−1) and a(j−2) is used, but the means value of the move commands a(j+2), a(j+1), a(j) and a(j−1) may alternatively be used. In this case, each position feedforward quantity b(j) in FIG. 5 is equal to the value obtained by shifting it to the left by one position/speed loop processing period Ts. Further, although the above embodiment is described with reference to the case wherein the position/speed loop process is executed four times (N=4) within one distribution period ITP, the number of the position and speed loop processes to be included in one ITP period is not limited to four.

I claim:

1. A feedforward control method for a servo system in which a position and speed loop process is periodically carried out a plural number of times within one distribution period in accordance with a move command periodically distributed from an upperlevel control device, comprising the steps of:
   (a) executing a position loop process in each position and speed loop processing period in accordance with a corresponding move command to calculate a provisional speed command;
   (b) calculating a mean value of each said move command from a move command corresponding to one of said each position and speed loop processing period and move commands corresponding to position and speed loop processing periods preceding and subsequent to said one position and speed loop processing period;
   (c) calculating a feedforward controlled variable in accordance with said mean value of the move commands; and
   (d) correcting said provisional speed command using said calculated feedforward controlled variable to obtain a speed command.

2. The feedforward control method according to claim 1, wherein said step (b) includes a step of previously reading a move command for a distribution period subsequent to a distribution period including said each position and speed loop processing period.

3. The feedforward control method according to claim 1, wherein said step (c) includes a step of multiplying the mean value of the move commands by a position feedforward coefficient.

4. The feedforward control method according to claim 1, further comprising the steps of:
   calculating a provisional torque command by executing a speed loop process in said each position and speed loop processing period;
   subjecting said mean value of the move commands to a lead compensation by a time period equal to a predetermined time as long as said each position and speed loop processing period;
   calculating a speed feedforward quantity in accordance with the differential value of said mean value of the move command which has been subjected to the lead compensation; and
   correcting the provisional torque command by using said speed feedforward quantity to obtain a torque command.

5. The feedforward control method according to claim 4, wherein said speed feedforward quantity is calculated by multiplying a differential value of said move command mean value, which has been subjected to the lead compensation, by a speed feedforward coefficient.

* * * * *

UNITED STATES PATENT AND TRADEMARK OFFICE
CERTIFICATE OF CORRECTION

PATENT NO. : 5,311,110
DATED : May 10, 1994
INVENTOR(S) : Yasusuke Iwashita

It is certified that error appears in the above-indentified patent and that said Letters Patent is hereby corrected as shown below:

Col. 2, line 27, delete "means" and insert --mean--.

Col. 3, line 22, delete "and" (2nd occurrence), and insert --a--.

Col. 4, line 32, delete "one" and insert --1--; and lines 41-47, delete entire equation (2) and insert $$c(j) = (\alpha 2 \cdot P' + \{\sum_{k=M/2-1+1}^{N/2-1} a(j-k) - \sum_{k=-N/2-1+2}^{N/2-1+1} a(j-k)\})/N \quad (2)$$

Col. 7, line 55, delete "means" and insert --mean--.

Signed and Sealed this

Twenty-seventh Day of September, 1994

Attest:

BRUCE LEHMAN

*Attesting Officer*   *Commissioner of Patents and Trademarks*